United States Patent [19]

Verheijen et al.

[11] Patent Number: 5,185,426
[45] Date of Patent: Feb. 9, 1993

[54] PROCESS FOR THE PRODUCTION OF POLYESTER WITH ENHANCED THERMO-OXIDATIVE STABILITY

[75] Inventors: Johannes M. Verheijen, Ranst; August M. Mariën, Westerlo, both of Belgium

[73] Assignee: Agfa-Gevaert, N.V., Mortsel, Belgium

[21] Appl. No.: 838,032

[22] Filed: Feb. 20, 1992

[30] Foreign Application Priority Data

Feb. 28, 1991 [EP] European Pat. Off. ........ 91200425.6

[51] Int. Cl.⁵ .................. C08G 63/692; C08G 63/695
[52] U.S. Cl. ..................... 528/272; 528/287; 528/308.6; 525/437; 525/444; 524/128; 524/539; 524/605; 524/710
[58] Field of Search .............. 528/272, 287, 308.6; 525/437, 444; 524/128, 539, 605, 710

[56] References Cited

U.S. PATENT DOCUMENTS

| | | | |
|---|---|---|---|
| 3,988,301 | 10/1974 | Jeurissen et al. | 528/274 |
| 4,086,212 | 4/1978 | Bier et al. | 528/302 |
| 4,107,149 | 8/1978 | Bier et al. | 528/309 |
| 4,314,928 | 2/1982 | Bier et al. | 524/605 |
| 4,385,145 | 5/1983 | Horn, Jr. | 524/120 |
| 4,440,924 | 4/1984 | Kuze et al. | 528/275 |
| 4,454,312 | 6/1984 | Kuze et al. | 528/275 |
| 4,604,453 | 8/1986 | Kuze et al. | 528/481 |

Primary Examiner—John Kight, III
Assistant Examiner—Sam A. Acquah
Attorney, Agent, or Firm—Breiner & Briener

[57] ABSTRACT

A continuous direct esterification and polycondensation process is disclosed for the production of polyester comprising units of ethylene terephthalate as the major repeating units by supplying a slurry of mainly terephthalic acid and ethylene glycol to bis(betahydroxyethyl) terephthalate or its oligomer so as to carry out esterification, followed by polycondensation whereby the resulting oligomer is kept under increasingly reduced pressure, characterized in that a stabilizing solution of an aliphatic diol containing a diethyl or tributyl phosphite and a hindered phenolic phosphonate is added to the reaction mixture before the start of the polycondensation.

7 Claims, 1 Drawing Sheet

PROCESS FOR THE PRODUCTION OF POLYESTER WITH ENHANCED THERMO-OXIDATIVE STABILITY

FIELD OF THE INVENTION

The present invention relates to a process for the production of polyester. More in particular, the present invention relates to a continuous so-called direct esterification and polymerisation process for the production of a polyester comprising units of ethylene terephthalate as the major repeating units, said polyester being substantially improved in particular in respect of its thermo-oxidative stability.

BACKGROUND OF THE INVENTION

Saturated linear polyesters such as polyethylene terephthalate (hereinafter referred to as PETP) are, owing to their excellent physico-chemical properties such as mechanical strength, heat and chemical resistance, transparancy etc., nowadays used for various applications such as packaging materials, electric insulating materials, fibres and filaments as well as support material for magnetic tapes and photographic films.

In view of their widespread use, the processes for manufacturing PETP-granulate and converting said PETP-granulate to film are well known to those skilled in the art.

PETP-film materials are generally obtained by melt-extrusion of the polyester through an extruder, rapidly cooling the-melt-extruded sheet on the surface of a cooling drum and then biaxially orienting the solidified material in longitudinal and transverse direction.

The polyester which is melt extruded can be prepared according to two main methods.

In a first method there is an ester exchange reaction between dimethyl terephthalate (DMT) and ethylene glycol (EG) to form bis(/-hydroxyethyl-terephthalate (BHET) whereupon polycondensation takes place. Both in the ester exchange reaction and in the polycondensation reaction catalysts are used : e.g. a zinc, magnesium, manganese, or cobalt salt or mixtures thereof in particular manganese acetate as ester exchange catalyst, and antimony compounds and/or germanium compounds (such as antimony and/or germanium dioxide) as polycondensation catalyst, and stabilisers such as e.g. phosphorus compounds.

In a second method the BHET is obtained by direct esterification of terephthalic acid (PTA) with ethylene glycol (EG). Antimony trioxide and/or germanium dioxide are also added as polycondensation catalyst and a phosphorus compound may be added as stabilizer.

The above processes may further be executed in either a batch or a continuous reactor system. Particulars about the direct esterification method are described in e.g. EU-A-0105 522 and EU-A-0159 817. Particulars about the first PETP production method (the ester exchange reaction method) may be found e.g. in GB A 1 221 788, GB-A-1 274 858, GB-A-1 108 096, GB-A-1 185 984 and GB-A-1,091 234.

Particulars about the film-forming process of PETP starting from PETP-granulate may be found in GB-A-1 269 127, GB-1-1 312 263 and EU-A-0 022 278.

During the film forming process the PETP-polymer is during a substantial period of time kept at elevated temperature and in contact with the surrounding air. According to a conventional process the PETP-polymer produced according to e.g. a continuous direct esterification and polycondensation process is after leaving the finishing polymerisation reactor quenched in a cooling bath, cutted to granules and pneumatically transported to the supply silos of the PETP-film extrusion plant. From these supply silos PETP-granulate is then pneumatically transported to the abovementioned dryers, and then further heated in an extrusion apparatus to PETP-melt suitable after filtration, for being melt-extruded. According to a more convenient and preferential way of working the PETP-melt such as produced in e.g. the continuous direct esterification and polycondensation process is directly fed in melt-form to the PETP-film extrusion apparatus.

It is apparent from the above description that the thermo-oxydative stability of the PETP-produced is an essential and critical requirement for producing PETP-film meeting high standards of quality. The latter applies in particular to PETP-polymer which should be melt-extruded for the production of PETP-films suitable as support for photographic films. One of the essential requirements set forth for PETP-films used as support for photographic materials is the clarity and the transparancy of the produced PETP-film. The transparancy of the PETP-film produced is determined to a large extent by controlling the crystallinity of the film during melt-extrusion. In particular during melt-extrusion a good heat transfer between the extruded PETP-film and the moving quenching drum should be realised. The method of electrostatically adhering the melt-extruded film to the quenching drum as disclosed in U.S. Pat. No. 4,310,294 may be applied so as to become a substantially amorphous film suitable for further processing, Including longitudinal stretching.

Another essential requirement however for obtaining clear transparent polyester film supports is the thermo-oxydative stability of the PETP-polymer itself. Knowing that the clarity and transparency of a polyester film sheet is enhanced by increasing the thermo-oxydative stability of the PETP-polymer various efforts have been performed to increase said PETP thermal stability by modifying the polyester used for the preparation of the PETP-film. Said efforts particularly are aimed to incorporate into the PETP-polymer stabilizing compounds during either extrusion or during the PETP-production process.

The German Patent Publication 1 152 259 discloses e.g. the incorporation of phosphoric acids or alkyl or aryl ester derivatives hereof for stabilising PETP. As examples of such compounds are mentioned triarylphosphates such as triphenylphosphate, trialkylphosphate such as triethylphosphate, tributylphosphate, and also partially esterified phosphoric acid derivatives such as dibutyl or diphenylphosphate.

The Belgian Patent no. 851,082 discloses the use of a mixture of triarylphosphites and phenolic compounds for heat stabilising various polymers including PETP.

The Belgian Patent no. 641,074 discloses the use of phosphonate compounds suitable for the oxidative stability of polyesters.

U.S. Pat. No. 4 385,145 discloses the stabilisation of poly(alkylene terephthalate) compositions by incorporation of bis-(alkylphenyl) pentaerythritol diphosphite ester. A particularly suitable stabiliser is bis-(2,4-di-t-butylphenyl) pentaerythritol diphosphonite, commercially available under the trade name Ultranox 626 from Borg Warner Chemicals Inc., Parkersburg W. Va, USA.

Research Disclosure no. 14434, published Apr. 1976 discloses a synergistic mixture of crosslinking inhibitor compounds comprising at least one phosphoric acid ester and at least one hindered phenolic compound to reduce color formation and to improve other physical properties of certain polyesters.

A particularly preferred example of hindered phenolic compounds cited is e.g. tetrakis-(methylene 3-(4'-hydroxy -3',5'-di-t-butylphenyl proprionate) methane commercially available under the trademark Irganox 1010 from Ciba-Geigy AG. Switzerland. Examples of preferred phosphorus acid esters are the fully esterified ester forms such as trialkyl, phenyl and alkylphenyl ester forms. EU-A-0 238 140 discloses a polyester resin composition particularly excellent in heat resistance comprising a crystalline polyester resin wherein a mixture of a hindered phenolic antioxidant and at least one antioxidant selected from phosphorus containing antioxidants and sulfur containing antioxidants is incorporated.

An example of such a mixture is e.g. the abovementioned tetrakis (methylene 3-(4'-hydroxy-3',5'-di-t-butylphenyl) proprionate) methane, and distearyl pentaerythritol diphosphite, commercially available under the trade name Weston 618 from Borg-Warner Corp., USA WO 88/01285 discloses the stabilization of thermoforming polyester compositions by using a combination of hindered phenolic antioxidant such as the compound marketed by Ciba-Geigy under the trade mark Irganox 1010, abovementioned, and phosphorus compounds such as phosphites and phosphonites including e.g. diphenyl phosphite, tristearylphosphite, and the compounds abovementioned presently marketed under the trade marks Ultranox 626 and Weston 618.

JP Kokai 76,111,858 disclose the stabilization of heat- and fire resistant polyester moldings by using a mixture of tri-methyl-phosphate and di-ethyl (3,5-di-tert-butyl-4-hydroxybenzyl) phosphonate, commercially available under the trade name Irganox 1222 from Ciba-Geigy AG.

In the article 'Effect of certain stabilizers on the thermal oxidation of poly(ethylene terephthalate) by Angelova, A. e.g., published in Khim Volokna 1978, (3), 19–20, the preparation of PETP-fibers with increased oxidative thermal stability are described by use of a mixture containing phenol- and phosphite-type compounds, such as Irganox 1222, abovementioned, and diglycol phosphate, triphenyl phosphite, or diphenyl isodecyl phosphite.

In the article 'Oxidative thermal stabilization of PETP' by Angelova A, e.a., God. Vissh., Khim. Tekhnol Inst. Sofia 1983 (Publ 1984) 29(2), 123–6, the oxidative thermal stability of PETP is described when using a mixture of i.a. Irganox 1222, abovementioned, and triphenyl phosphite.

In the article 'Effect of stabilisers on the preparation of PETP' by Chang, Shuya e.a., published in the J. Polym. Sci., Polym. Chem. Ed. 1982 20(8), 2053–61, the effect of stabilisation of a mixture of Irganox 1222, abovementioned, and triphenyl or trimethyl phosphates on the preparation of PETP is described.

In spite of the extensive prior art literature on the stabilisation of PETP-polymer, and the various solutions disclosed therein relating to the selection of specific stabilising additives, their time of addition to the reaction mixture. and various suggestions in respect of the molar ratio to be respected between the selected stabilizing compounds, the stabilization of the PETP-polymer, produced according to a continuous direct esterification and polycondensation process still is insufficient for the purposes of melt-extruding said PETP faultlessly to PETP-film suitable for being used as clear transparent support for photographic films.

The difficulty in producing PETP-polymer characterised by a high thermo-oxidative stability according to the continuous direct esterification and polycondensation process is particularly severe as the latter process becomes nowadays the state-of-the-art process for the production of PETP-polymer.

Indeed although various combinations of stabilising compounds have been described in the prior art literature, none of these combinations are suitable for producing PETP-polymer suitable for being used as support for photographic materials according to the continuous direct esterification and polycondensation process. On the one hand the high quality standards set forth for PETP-film sheets suitable for use as support for photographic materials, are different and/or more severe than the corresponding specifications for PETP-polymer intended for further processing to packaging materials, insulation materials injection molding materials or fibres. These specifications relate in particular to the color, the clarity and the transparency of PETP-polymer intended for further processing to sheets serving as support for photographic emulsions.

On the other hand the combination of stabilising compounds must conform to specifications set forth by the particulars of a continuous direct esterification and polycondensation process. Such specifications are e.g. the compatibility of the selected stabilising compounds with the polycondensation catalysts used and with the electroconductivity enhancing additives selected. The selected stabilising compounds must further not accumulate in any of the reactors or filters used in the continuous process, and must in general be compatible with the processing conditions in terms of temperature and pressure of such process. As the electroconductivity of the PETP-polymer produced is an important specification in view of the further processing through melt-extrusion of such PETP to film suitable as support for photographic materials, the selected stabilising compounds must not adversely affect the electroconductivity of the resulting PETP.

Finally the selected stabilising compounds must conform to environmental/ecological requirements in particular they must not cause any harmfull smell, and not be toxic. Last but not least, the selected stabilising compounds must be commercially available at reasonable conditions.

The specification in respect of clarity or color value of PETP-polymer, suitable for being melt-extruded to PETP-sheets for use as support for photographic materials, is as follows: the color value of PETP-polymer measured in accordance with the procedure described hereinafter, must be less or equal to 1.0.

The specification in respect of thermo-oxidative stability of PETP-polymer, suitable for being melt-extruded to PETP-sheets for use as support for photographic materials is as follows: the thermo-oxidative stability of PETP-polymer measured as a loss in weight in accordance with the procedure described hereinafter, must be less or equal to 0.35%.

OBJECT OF THE INVENTION

It is therefore an object of the present invention to provide a continuous direct esterification and polycondensation process for the production of PETP-polymer whereby the resulting PETP-polymer has an appropriate degree of thermo-oxidative stability and good color-value such that it may faultlessly be melt-extruded and further processed to PETP-film suitable for being used as clear transparent support for photographic film.

It is a further object of the present invention to provide a PETP-polymer production process such that the resulting polymer has a color value less or equal to 1.0 as defined hereinafter and a thermo-oxidative stability which is high enough so that the weight loss in a test as defined hereinafter is lower or equal to 0.35%.

It is a further object of the present invention to provide a PETP-polymer production process whereby the resulting PETP-polymer has an enhanced thermo-oxidative stability, measured in accordance with the method described hereafter as compared to conventionally produced PETP-polymer.

Further objects and advantages will become apparent from the description hereinafter.

SUMMARY OF THE INVENTION

In accordance with the present invention we now have found that the above objects may be accomplished by providing a continuous direct esterification and polycondensation process for the production of polyester comprising units of ethylene terephthalate as the major repeating units by supplying a slurry of mainly terephthalic acid and ethylene glycol to bis(betahydroxyethyl) terephthalate or its oligomer so as to carry out esterification followed by polycondensation whereby the resulting oligomer is kept under increasingly reduced pressure, characterised in that a stabilising solution of an aliphatic diol containing diethyl or tributyl phosphite and a hindered phenolic phosphonate is added to the reaction mixture before the start of the polycondensation.

According to a preferred embodiment said process is further characterised in that the stabilising solution is added to the slurry of terephthalic acid and ethylene glycol.

Further preferred embodiments will become clear from the description hereinafter.

DETAILED DESCRIPTION OF THE INVENTION

Combination of stabilising compounds

Figure 1:
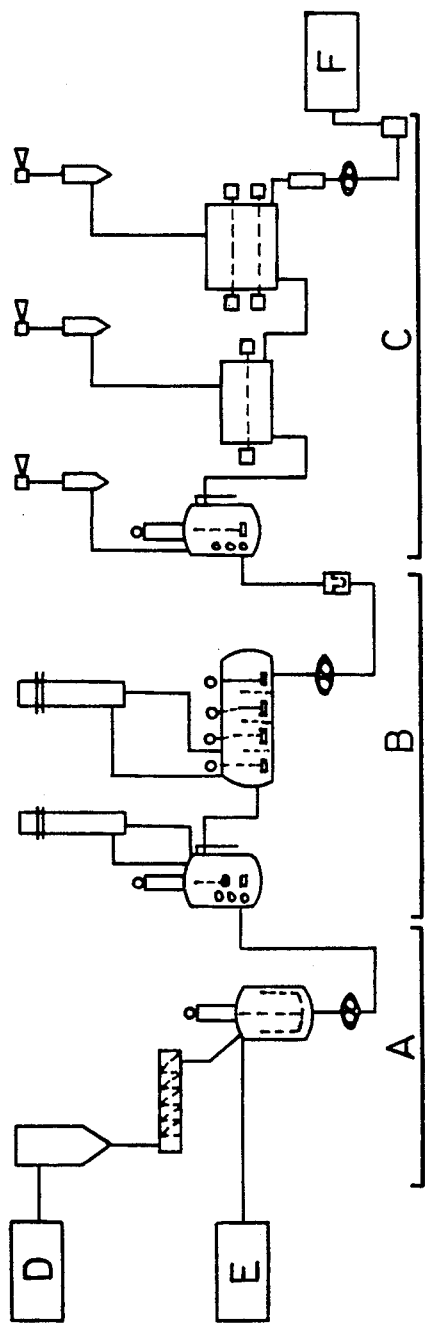

After many experiments we have found that a combination of a diethyl or tributyl phosphite and a hindered phenolic phosphonate antioxidant, added as a solution of both compounds in an aliphatic diol, preferably ethylene glycol, yields a PETP-polymer meeting the specifications set forth as the object of our invention. Said solution should preferably be added to the slurry of terephthalic acid and ethylene glycol or to the oligomer reaction mixture during the continuous direct esterification and polycondensation process. In view of obtaining a PETP-polymer with a high electroconductivity such stabiliser-combination should preferably be added to the slurry mixture, whereas the electroconductivity enhancing additives should be added near the end of the esterification reaction. i.e. when the esterification rate has reached at least 80%. Preferred examples of hindered phenolic phosphonates are the fully esterified derivatives forms of 3,5-di-tert.butyl-4-hydroxy benzyl phosphonic acid.

A particularly preferred phosphonate is the diethyl ester of 3,5-di-tert.butyl-4-hydroxybenzylphosphonic acid. The latter compound is commercially available from Ciba-Geigy AG. Basel, Switzerland (trade name Irganox 1222). The molar ratio between the hindered phenolic phosphonate and the diethyl or tributyl phosphite should preferably be comprised between 3:1 and 1:3. The concentration of each of these compounds in the final PETP produced should preferably be situated between 0.05 and 0.3 mmol/mol PETP.

Polyester

The polyester may be obtained in accordance with the present invention by condensing one or more dicarboxylic acids e.g. terephthalic acid, isophthalic, phthalic, 2,5- , 2,6- and 2,7 naphthalene dicarboxylic acid, succinic acid, sebacic acid adipic acid, azelaic acid, diphenyl dicarboxylic acid, optionally a monocarboxylic acid, such as pivalic acid, with one or more glycols, e.g. ethylene glycol, 1,2- or 1,3-propanediol, 1,4-butanediol neopentyl glycol and 1,4-cyclohexanedimethanol. However the polyester should comprise units of ethylene terephthalate as the major repeating units.

Continuous process

The esterification and the polycondensation steps in the process of this invention may be carried out by per se conventional procedures except incorporation of certain amounts of the selected stabilising compounds into the reaction system at certain stages. We will refer hereinafter to the use of terephthalic acid and ethylene glycol and to the production of PETP (polyethylene terephthalate polymer) but it is to be understood that other acids and/or glycols as referred to above may be added as well to produce esters with different ester units the majority of the units being ethylene terephthalate units.

The continuous direct esterification process uses, for instance, 2 to 4 reaction vessels, whereby terephthalic acid and ethylene glycol are supplied in slurry-form to bis(beta-hydroxyethyl)terephthalate or its oligomer.

The esterification may be carried out under any pressure of not more than about 1 bar above atmospheric pressure. A pressure exceeding about 1 bar above atmospheric pressure will unfavorably increase the by-production of diethylene glycol.

Terephthalic acid and ethylene glycol are usually introduced into the reaction system as a slurry, because of easy handling and accurate measuring. In the slurry, the molar ratio of ethylene glycol and terephthalic acid is preferred to be from about 1.05 to 1.5, particularly from about 1.05 to 1.30. When the molar ratio is less than about 1.0, handling of the slurry is difficult. When more than about 1.5, the by-production of diethylene glycol is increased. The slurry may be prepared by the use of any conventional mixing apparatus and supplied to the reaction system by the aid of a supply pump.

The esterification is carried out at a temperature between 240° C. and 280° C. When the temperature is below 240° C., the reaction period is longer, and the production becomes uneconomical. When the temperature is beyond 280° C., the by-production of diethylene glycol and the coloration of the product are increased.

For the esterification, there is no requirement to use any catalyst.

The polycondensation should also be conducted continuously. A suitable temperature for polycondensation is below 285° C. and preferably from 270° to 280° C. A higher temperature will increase the coloration of the product. Polycondensation is carried out under increasingly reduced pressure.

The catalyst for polycondensation is not limitative but preferably chosen from antimony compounds, germanium compounds and titanium compounds.

An installation for the continuous direct esterification of terephthalic acid with ethylene glycol followed by low-pressure polymerization in a continuous polymerizer and in a finisher polymerizer to produce polyester suitable for melt-spinning into yarn for textile uses is fully described in U.S. Pat. No. 4,110,316.

Such installation is also suitable for the production of polyesters according to the present invention which are then melt-extruded to form a thermoplastic support for photographic films, provided the process conditions are as set forth hereinafter, and a suitable catalyst/stabilizer combination is used as described hereinafter.

An alternative, slightly modified process and installation for the production of polyester suitable for use in accordance with our invention and according to the direct esterification and polycondensation method is described in GB-A-1,296,242.

For the production of PETP-polymer according to our invention a preferred process is the so-called, "HITACHI Continuous Polyester Process" as described e.g. in Hitachi Review Vol. 27 (1978) No. 1, pages 13-16 and a preferred plant and apparatus is the "HITACHI Continuous Plant" as described in Hitachi Review Vol. 28 (1979), No. 2, pages 83-88.

FIG. 1 is a schematic representation of the Hitachi Basic Process Flow.

As is clear from FIG. 1, this continuous process comprises three basic stages:
(A) is the feed stage of the terephthalic acid and ethylene glycol,
(B) is the esterification stage, and
(C) represents the polycondensation stage.

The essential features of these stages are as follows:
(A) Features of feed stage As shown in FIG. 1 pure terephthalic acid (PTA) (represented by D in FIG. 1) and ethylene glycol (EG) (represented by E in FIG. 1) are fed directly into the slurry mixing tank. PTA is fed continuously and constantly by a special powder weighing device.
(B) Features of the esterification stage The slurry is fed directly into the esterification stage. Two reactors are arranged in series in this stage. Evaporated EG is totally refluxed to each reactor, so the response of EG reflux rate is quick and the conversion of esterification is controlled easily and rigidly. As shown, the second reactor is of the cascade type.
(C) Features of polycondensation (PC) stage As is shown in FIG. 1 three reactors are used in this stage. The pressure in the reactors is increasingly reduced down streams so the vacuum degree of each reactor is moderate for the degree of polymerization. The second reactor is a special type horizontal single-shaft processor and the finisher is a Hitachi twin-shaft processor with spectacles-shaped blades.

After the slurry mixing tank, the second esterification reactor and the third polycondensation reactor also called Finisher reactor, gear pumps are installed and after the second esterification reactors and first polycondensation reactor filtration systems are foreseen for eliminating impurities.

Section F in FIG. 1 represents the quenching and cutting section, converting the PETP produced to PETP-granules, or represents the section directly transporting the PETP produced in melt-form to the PETP-film extrusion apparatus.

Catalysts and electroconductivity enhancing additives

The usual polycondensation catalyst in the PETP-polymer production process of our invention is antimony trioxide and/or germanium dioxide: however any of the known other catalysts used for polycondensation can be applied in the process of our invention.

The usual additives for enhancing the electroconductivity of the PETP produced can be used in accordance with the present invention and include metallic compounds such as alkali metals, alkaline earth metals, or a metal selected from chromium cupper, manganese or cobalt salts or mixtures thereof.

These metal compounds can be used for enhancing the electroconductivity of the PETP in the form of oxides, carboxylates such as acetates, benzoates, carbonates, oxalates etc. of said metal. Specifically, there are given for example magnesium acetate, calcium carbonate, calcium acetate, lithium acetate, strontium acetate, barium acetate, strontium benzoate, barium benzoate, sodium phthalate, calcium phthalate, calcium terephthalate, barium terephthalate, manganese acetate, cobalt acetate, lead acetate and the like. These compounds are usually added from solutions in an aliphatic diol, most preferably from a solution in ethylene glycol.

Apart from the selection of the appropriate catalyst/additives combination, the time and method of addition of the selected compounds in the reaction mixture is also important.

With respect to the addition of the polycondensation catalyst, it suffices to add these compounds in due time to the reaction mixture before the polycondensation takes place i.e. it may be added right from the start or during esterification. Generally these compounds are added at the end of the esterification, e.g. in the second esterification reactor of the Hitachi Continuous Process.

Now with respect to the method and time of addition of the electroconductivity enhancing additive, it is known conventionally that the electroconductivity of PETP produced according to a continuous direct esterification and polycondensation process may be significantly enhanced if the solution in an aliphatic diol such as ethylene glycol of the electroconductivity enhancing metallic compound is added when the esterification is substantially completed, i.e. at the end of the esterification reaction when the esterification rate has reached at least 80%. In case of the continuous Hitachi PETP-production process such solution is conventionally added in the cascade-type second esterification reactor.

The invention will now be illustrated hereinafter by means of examples.

COMPARATIVE EXAMPLE 1

Polyethylene terephtalate was produced in a laboratory reactor according to the discontinuous direct esterification and polycondensation reaction process, more in particular according to the process described in U.S. Pat. No. 4,008,048.

The production capacity of one batch amounted to 0.2 mol of PETP-polymer, starting from 0.1 mol of terephthalic acid and 0.06 mol of ethylene glycol added to 0.1 mol of bis(beta hydroxyethyl)terephthalate as raw materials.

As electroconductivity enhancing additive a solution of $Mg(OAc)_2.4H_2O$ available from Riedel de Haen A G, Wunstorferstrasse 40, D-3016 Seelze 1, F. R. Germany, was added in a concentration of $3.5 \times 10^{-4}$ mol of $Mg(OAc)_2$/mol PETP. This additive was added as a solution of $Mg(OAc)_2$ in ethylene glycol, said solution being added at the beginning of the esterification reaction.

A mixture of $GeO_2/Sb_2O_3$ was used as polycondensation catalyst in a concentration of $1.10^{-4}$ mol $GeO_2$/mol PETP, resp, $1.10^{-4}$ mol $Sb_2O_3$/mol PETP. This catalyst mixture was added as a solution of $GeO_2/Sb_2O_3$ in ethylene glycol, said solution being added at the end of the esterification reaction.

As stabiliser compound was used a solution in ethylene glycol of Irganox 1222, abovementioned added to the mixture of terephthalic acid and ethylene glycol such that its concentration in the resulting PETP amounted to $2.0 \times 10^{-4}$ mol of Irganox 1222/mol PETP.

The intrinsic viscosity was measured on a solution of 0.5 g of PETP in 100 ml of a mixture of 40 parts by weight of phenol and 60 parts by weight of 1,2-dichloorbenzene, in the way as described in ISO 1628/1 and ISO 1628/5 standards.

The color value of the PETP-polymer so produced amounted to 2.0; the thermo-oxidative stability of said PETP-polymer, expressed as a weight loss, amounted to 0.31%.

The procedure for measuring the color value of the PETP produced was as follows: the color of a PETP-polymer sample is determined by visual comparison on molten PETP-granules with a standard coloured solution. Therefore 20 g of PETP polymer is placed in a glass test tube equipped with a capillary, flushed with dry nitrogen, and dried for 2 hours at 157° C. under a reduced pressure of 0.1 mm Hg. The test tube with the PETP-polymer is then heated in a vapour bath of boiling dimethyl phthalate (282° C.) until the polymer is completely molten, after approximately 6 min: during this procedure a continuous current of dry nitrogen is introduced in the test tube via the capillary. As soon as the polymer is completely molten the vapour bath is removed and the colour of the molten polyester is measured. The determination of the colour number value is then performed by a visual comparison of the colour of the molten polyester by means of comparison colours against a white background. The comparison colours are given by aqueous solutions in sealed test tubes of "Direct Brown 74 dyestuff", being a polyazo dye, Color Index Number 36300, supplied by TRI CON COLOR, New Jersy, USA. As colour scale the following solutions are used:

0 = water
1 = 0.00025 g of the above dyestuff per 100 ml of solution
2 = twice as much dyestuff as 1
3 = three times as much dyestuff as 1
4 = etc.

The procedure for measuring the thermo-oxidative stability of PETP was as follows: the determination of the thermal-oxidative stability of PETP-polymer is executed by a gravimetric determination of the loss of weight of the PETP-polymer after a thermal treatment at 245° C. under a constant flow of air. The actual procedure is as follows: 10 g of PETP-polymer is grinded together with solid carbondioxide (acting as cooling medium) and the ground granulate is sieved whereby the fraction between 500 and 1500 micron is collected. 2 g of this fraction is placed in a test tube, flushed with dry nitrogen and dried for 2 hours under a reduced pressure of 0.1 mm Hg in a drying chamber at a temperature of 150° C.

Meanwhile a glass dish is placed in the drying oven at 245° C. for 15 minutes, it is cooled in a desiccator and weighed with an accuracy of 0.0001 g. About 1 g of dried polymer (weight accuracy 0.0001 g) is placed in the glass dish and the sample is heated at 245° C in an air circulation drying oven for exactly 1 h.

The glass dish is then cooled in the desiccator till room temperature. The percentage loss of weight is determined gravimetrically and is a measure for the thermal-oxydative stability.

This determination is done twice, and the average value is calculated. This average value is a measure for the thermo-oxidative stability of the PETP-sample and expressed as a weight loss percentage.

COMPARATIVE EXAMPLE 2

The process for producing PETP-polymer as described under Comparative Example 1 was repeated with the difference however that together with the Irganox 1222 stabilising compound Trimethylphosphate, available from Daihachi Chemical Industry Co. Ltd., 3-54, Chodo, Higashi-Osaka City, Osaka, Japan was added as second stabilising compound in the ethylene glycol stabilising solution. The amount of Trimethylphosphate in the PETP-polymer so produced amounted to $1.6 \times 10^{-4}$ mol of Trimethylphosphate/mol PETP.

The color value of the PETP-granulate produced according to this procedure then amounted to 1.5, and the thermo-oxidative stability of said PETP expressed as a weight loss amounted to 0.35%.

COMPARATIVE EXAMPLE 3

The process for producing PETP-polymer as described under Comparative Example 1 was repeated with the difference however that together with the Irganox 1222 stabilising compound Trimethylphosphite, available from Janssen Chimica 2350 Beerse, Belgium was added as second rstabilising compound in the ethylene glycol stabilising solution. The amount of Trimethylphosphite in the PETP-polymer so produced amounted to $1.6 \times 10^{-4}$ mol of Trimethylphosphite per mol of polyester.

The color value of the PETP-granulate produced according to this procedure then amounted to 1.0, and the thermo-oxidative stability of said PETP expressed as a weight loss amounted to 0.41%.

COMPARATIVE EXAMPLE 4

The process for producing PETP-polymer as described under Comparative Example 1 was repeated with the difference however that together with the Irganox 1222 stabilising compound, Triphenylphosphate, available from Bayer AG, 5090 Leverkusen, Germany was added as second stabilising compound in the ethylene glycol stabilising solution. The amount of Triphenylphosphate in the PETP-polymer so produced amounted to $1.6 \times 10^{-4}$ mol of Triphenylphosphate per mol of polyester.

The color value of the PETP-granulate produced according to this procedure then amounted to 1.0, and the thermo-oxydative stability of said PETP expressed as a weight loss amounted to 0.40%.

COMPARATIVE EXAMPLE 5

The process for producing PETP-polymer as described under Comparative Example 1 was repeated with the difference however that together with the Irganox 1222 stabilising compound, Weston 600 being diisodecyl Pentaerythritol disphosphite, available from Borg Warner Chemicals, Inc., Parkersburg, West Virginia 26101, USA was added as second stabilising compound in the ethylene glycol stabilising solution. The amount of Weston 600 in the PETP-polymer so produced amounted to $0.8 \times 10^{-4}$ mol of Weston 600 per mol of polyester.

The color value of the PETP-granulate produced according to this procedure then amounted to 1.5, and the thermo-oxydative stability of said PETP expressed as a weight loss amounted to 0.33%.

COMPARATIVE EXAMPLE 6

The process for producing PETP-polymer as described under Comparative Example 1 was repeated with the difference however that together with the Irganox 1222 stabilising compound, Ultranox 626 being bis (2,4-di-t-butylphenyl pentaerythritol) diphosphonite, available from Borg Warner Chemicals Inc., abovementioned, was added as second stabilising compound in the ethylene glycol stabilising solution. The amount of Ultranox 626 in the PETP-polymer so produced amounted to $0.8 \times 10^{-4}$ mol of Ultranox 626 per mol of polyester.

The color value of the PETP-granulate produced according to this procedure then amounted to 1.5, and the thermo-oxydative stability of said PETP expressed as a weight loss amounted to 0.26%.

COMPARATIVE EXAMPLE 7

The process for producing PETP-polymer as described under Comparative Example 1 was repeated with the difference however that together with the Irganox 1222 stabilising compound, Irgafos 168 being tri-2,4-di-tert-butylphenyl phosphite, available from Ciba-Geigy AG, 4002 Basel, Switzerland was added as second stabilising compound in the ethylene glycol stabilising solution. The amount of Irgafos 168 in the PETP-polymer so produced amounted to $1.6 \times 10^{-4}$ mol of Irgafos 168 per mol of polyester. The color value of the PETP-granulate produced according to this procedure then amounted to 1.0, and the thermo-oxydative stability of said PETP expressed as a weight loss amounted to 0.33%.

COMPARATIVE EXAMPLE 8

The process for producing PETP-polymer as described under Comparative Example 1 was repeated with the difference however that together with the Irganox 1222 stabilising compound, Diethylhexylphosphate, available from Bayer AG, abovementioned, was added as second stabilising compound in the ethylene glycol stabilising solution. The amount of Diethylhexylphosphate in the PETP-polymer so produced amounted to $1.6 \times 10^{-4}$ mol of Diethylhexylphosphate per mol of polyester.

The color value of the PETP-granulate produced according to this procedure then amounted to 1.25, and the thermo-oxydative stability of said PETP expressed as a weight loss amounted to 0.31%.

COMPARATIVE EXAMPLE 9

The process for producing PETP-polymer as described under Comparative Example 1 was repeated with the difference however that together with the Irganox 1222 stabilising compound, diethylcarboxymethylphosphonate, available from Hoechst A G. F. R. Germany, was added as second stabilising compound in the ethylene glycol stabilising solution. The amount of diethylcarboxymethylphosphonate in the PETP-polymer so produced amounted to $1.6 \times 10^{-4}$ mol of diethylcarboxymethylphosphonate/mol of PETP. The color value of the PETP-granulate so produced amounted to 1.25, and the thermo-oxydative stability of said PETP, expressed as a weight loss, amounted to 0.35%.

EXAMPLE 10

The process for producing PETP-polymer as described under Comparative Example 1 was repeated with the difference however that together with the Irganox 1222 stabilising compound, tributylphosphite, available from Janssen Chimica, 2350 Beerse, Belgium was added as second stabilising compound in the ethylene glycol stabilising solution. The amount of tributylphosphite in the PETP-polymer so produced amounted to $1.6 \times 10^{-4}$ mol of tributhylphosphite/mol of polyester.

The color value of the PETP-granulate produced according to this procedure then amounted to 1.0, and the thermo-oxydative stability of said PETP expressed as a weight loss amounted to 0.30%.

EXAMPLE 11

The process for producing PETP-polymer as described under Comparative Example 1 was repeated with the difference however that together with the Irganox 1222, Diethylphosphite, available from Bayer AG, abovementioned, was added as second stabilising compound in the ethylene glycol stabilising solution. The amount of Diethylphosphite in the PETP-polymer so produced amounted to $1.6 \times 10^{-4}$ mol of Diethylphosphite per mol of polyester.

The color value of the PETP-granulate produced according to this procedure then amounted to 1.0, and the thermo-oxydative stability of said PETP expressed as a weight loss amounted to 0.35%.

EXAMPLES 12 TO 15

The procedure for producing PETP-polymer as described in Comparative Example 2 was repeated with the following difference however: instead of carrying out said PETP-production process in a laboratory reactor, said process was executed in a commercial scale plant with the following particulars:

Polyethylene terephthalate was produced according to the direct esterification and polycondensation reaction process, more in particular according to the continuous Hitachi process and apparatus as outlined above, starting from pure terephthalic acid and ethylene glycol as raw materials.

The production capacity amounted to 104 tons per day and the process conditions in the various reactors were as follows:

| Reactor no. | Temperature | Pressure |
| --- | --- | --- |
| Esterification section | | |
| first Reactor | 268° C. | 1.7 bar |
| second Reactor | 268° C. | atmospheric |
| Polycondensation section | | |
| first Reactor | 272° C. | 27 mbar |
| second Reactor | 272° C. | 5 mbar |
| third Reactor | 275° C. | 1.5 mbar |

After the first esterification Reactor, the esterification rate amounted to approx. 85%. after the second esterification reactor, the esterification rate amounted to 96-97%. and the inherent viscosity of the PETP produced, as measured in a phenol/dichloorbenzene mixture, amounted to 0.57 dl/g.

As polycondensation catalysts, a mixture of $GeO_2/Sb_2O_3$ was used in a concentration of $0.4 \times 10^{-4}$ mol $GeO_2$/mol PETP, resp. $1.4 \cdot 10^{-4}$ mol $Sb_2O_3$/mol PETP. Said catalyst mixture was added as a solution of $GeO_2/Sb_2O_3$ in ethylene glycol, said solution being added at a rate of 50.3 kg/h in the last section of the second esterification Reactor.

As electroconductivity enhancing additive a solution of $Mg(OAc)_2.4 H_2O$ available from Riedel de Haen, cited supra, in ethylene glycol was added, said solution being prepared as follows: to 4.784 l of ethylene glycol were added 78.1 kg of $Mg(OAc)_2.4 H_2O$, said reaction mixture was subsequently stirred at room temperature till a complete solution was obtained. A constant feed rate of 116.9 kg/h of said solution was then continuously fed by a dosing pump in the second esterification Reactor, such that the concentration of magnesium acetate in the resulting PETP amounted to $3.5 \times 10^{-4}$ mol of $Mg(OAc)_2$/mol PETP.

As stabilizer compound was used the stabiliser combination described in Comparative Example 2, being a solution in ethylene glycol of Irganox 1222 and trimethylphosphate. Said solution was prepared by adding 90 kg of said Irganox compound and 28.3 kg of trimethylphosphate to 3526 liter of ethylene glycol under constant stiring whilst heating up to 70° C. until complete solution was obtained. Said solution was then added at a rate of 72.5 kg/h by a closing pump such that the concentration in the resulting PETP amounted to $2.0 \times 10^{-4}$ mol of Irganox 1222/mol PETP and 1.6 mol of Trimethylphosphate/mol PETP. Said solution was added to the slurry vessel.

When the color value and the thermo-oxidative stability of the PETP-polymer so produced was measured the experimental results determined on the PETP-sample produced in the discontinuous laboratory reactor according to the procedure described under Comparative Example 2 were confirmed.

In a similar manner, the PETP production procedures described in the Comparative Examples 5 and 6 and Example 11 were repeated in the commercial scale plant described above. The experimental results in respect of color value and thermo-oxidative stability determined in the laboratory scale reactor were confirmed in said commercial scale plant.

Evaluation

In the Table 1 set forth hereunder the experimental results of the abovementioned PETP-polymer production processes, comparative examples 1 to 9 and examples 10 and 11, are summarised. Column 1 sets forth the (comparative) example number, column 2 indicates which stabilising compound was used along with the hindered phenolic phosphonate, column 3 sets forth the concentration of the selected stabilising compound in $10^{-4}$ mol of stabilising compound per mol PETP, column 4 indicates the color value and column 5 indicates the thermo-oxidative stability, expressed as a weight loss after 60 min, of the various PETP-polymers produced.

| Example no. | Stabilizer | Conc. | Color value | Thermo-oxidative Stability, expressed as weight loss % |
| --- | --- | --- | --- | --- |
| 1 | — | — | 2.0 | 0.31 |
| 2 | Trimethylphosphate | 1.6 | 1.5 | 0.35 |
| 3 | Trimethylphosphite | 1.6 | 1.0 | 0.41 |
| 4 | Triphenylphosphate | 1.6 | 1.0 | 0.40 |
| 5 | Weston 600 | 0.8 | 1.5 | 0.33 |
| 6 | Ultranox 626 | 0.8 | 1.5 | 0.26 |
| 7 | Irgafos 168 | 1.6 | 1.0 | 0.33 |
| 8 | Diethylhexylphosphate | 1.6 | 1.25 | 0.31 |
| 9 | Diethylcarboxymethylphosphonate | 1.6 | 1.25 | 0.35 |
| 10 | tributhylphosphite | 1.6 | 1.0 | 0.30 |
| 11 | Diethylphosphite | 1.6 | 1.0 | 0.35 |

On the basis of the specifications set forth supra for the color value (less or equal to 1.0) and the thermo-oxidative stability (weight loss less or equal to 0.35) only the PETP produced according to the processes of examples no. 7, 10 and 11 is suited for being further processed through melt-extrusion to PETP-sheets suitable as support for photographic materials.

Apart from the selection criteria based upon specifications for color value and thermo-oxidative stability all of the stabiliser combinations of the comparative examples are not suited for being used in a continuous direct esterification and polycondensation PETP production process for various other reasons:

Trimethylphosphate appears to have toxic and/or cancerogenic properties;

trimethylphosphite diffuses a quite unpleasant smell;

triphenylphosphite as well as triphenylphosphate has the disadvantage that during the esterification step, phenol is released by said compound; although in a batch process such release causes no substantial problems, in a continuous PETP production process on the contrary, said phenol is accumulated into the oligomer reaction mixture thereby causing unfavorable side reactions to occur that finally adversely effect the quality of the resulting PETP-polymer; also the recuperation of spent ethylene glycol produced during the polycondensation step becomes difficult;

Weston 600 also diffuses an unpleasant smell; further isodecanol is also released by said compound during esterification and diffuses also an unpleasant smell.

Ultranox 626 and Irgafos 168 both have the disadvantage of releasing 2,4-di-tert-butyl phenol during esterification; this product is distilled out of the esterification reactors by the distillation columns aimed at releasing the water formed during the esterification reaction: this product causes a narrowing and eventually blocking of the water release pipes.

Diethylhexylphosphate finally also diffuses a quite unpleasant smell.

As a conclusion it may be set forth that only the combination of the hindered phenolic phosphonate with the compounds of the last two examples being diethyl and tributhyl phosphites meets the various requirements set forth above.

We claim:

1. A continuous direct esterification and polycondensation process for the production of polyester comprising units of ethylene terephthalate as the major repeating units by supplying a slurry of mainly terephthalic acid and ethylene glycol to bis(betahydroxyethyl) terephthalate or its oligomer so as to carry out esterification followed by polycondensation whereby the resulting oligomer is kept under increasingly reduced pressure, characterised in that a stabilising aliphatic diol solution containing diethyl or tributhyl phosphite and a hindered phenolic phosphonate is added to the reaction mixture before the start of the polycondensation.

2. A process according to claim 1, wherein the stabilising solution is added to the slurry of mainly terephthalic acid and ethylene glycol.

3. A process according to claim 1, wherein the aliphatic diol, wherein the stabilising compounds are dissolved, is ethylene glycol.

4. A process according to claim 1, wherein the hindered phenolic phosphonate is a 3,5-di-tert.butyl-4-hydroxybenzyl phosphonate.

5. A process according to claim 4, wherein the hindered phenolic phosphonate is the diethyl ester of 3,5-di-tert-butyl-4-hydroxybenzyl phosphonic acid.

6. A process according to claim 1, wherein the molar ratio between the diethyl or tributhyl phosphite and the hindered phenolic phosphonate is situated between 1:3 and 3:1.

7. A process according to claim 1, wherein the diethyl or tributhyl phosphite and the hindered phenolic phosphonate are both added in such amounts that their concentration in the polyethylene terephthalate produced is situated between 0.05 and 0.3 mmol per mol of polyester.

* * * * *